(No Model.)
A. THOMPSON.
TOOL FOR INSERTING CASTERS.
No. 267,379. Patented Nov. 14, 1882.
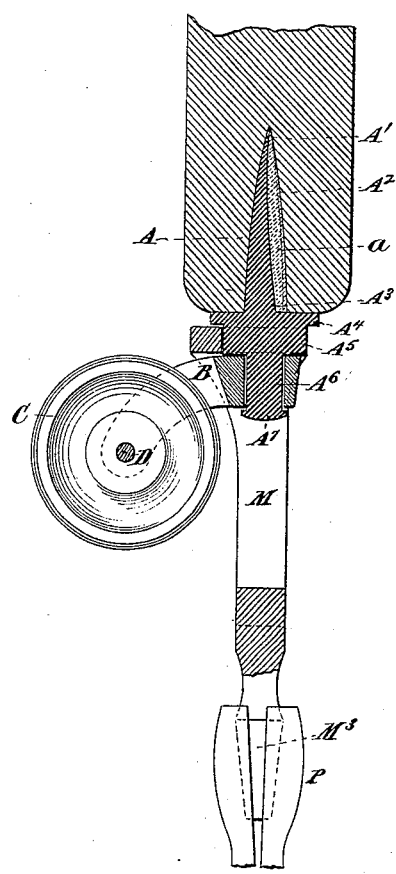
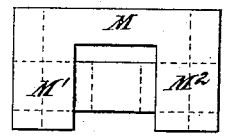
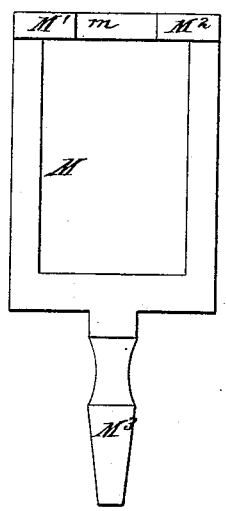
Witnesses—
H. J. England.
J. M. Kalb
Inventor—
Arthur Thompson
by his attorney
Thomas D. Stetson

UNITED STATES PATENT OFFICE.

ARTHUR THOMPSON, OF BROOKLYN, NEW YORK.

TOOL FOR INSERTING CASTERS.

SPECIFICATION forming part of Letters Patent No. 267,379, dated November 14, 1882.

Application filed August 10, 1882. (No model.)

*To all whom it may concern:*

Be it known that I, ARTHUR THOMPSON, of Brooklyn, in the county of Kings and State of New York, have invented certain new and useful Improvements in Tools for Inserting Casters, of which the following is a specification.

The object of my invention is to conveniently seize and turn, while at the same time pressing inward on, the suitably-formed shank of a caster.

The accompanying drawings form a part of this specification, and represent what I consider the best means of carrying out the invention.

Figure 1 is a vertical section of the caster and the tool, showing the latter applied and ready for use. Fig. 2 is an elevation of the tool at right angles to Fig. 1, and Fig. 3 is a plan view.

Similar letters of reference indicate corresponding parts in all the figures.

I will describe my tool as being used for setting a caster, in which the shank performs also the function of boring the hole in the leg of the piece of furniture to which it is to be applied; but it is well understood that my tool can be used in connection with any kind of caster which requires to be turned forcibly in the act of setting it.

A is the shank of the caster, made of steel or hard iron, certain portions being designated, when necessary, by additional marks, as A', A². The upper end of the shank is contracted, as indicated by A'. A cavity, $a$, extends along a considerable length of the shank. This cavity is large at the upper end and grows less downward. The shank presents sharp cutting-edges A², extending up and down.

A³ is the cylindrical exterior of the portion which is inserted in the wood of the leg.

A⁴ is a broad collar, and A⁵ a squared portion immediately adjacent thereto.

A⁶ is a cylindrical portion of the shank.

A⁷ is a riveted head.

B is the revolving or swiveling frame of the caster, C the wheel, and D the pin or rivet on which the wheel turns. These parts B C D may be of any ordinary or suitable construction.

M is the shank or body of my setting-tool, and M' M² lateral arms therefrom, extending in a plane at right angles to the axis of the shank. The space between these arms is marked $m$. The inner edges of the arms M' M² are made exactly parallel and adapted to match nicely against the opposite faces of the squared edge A⁵ on the shank of the caster. The opposite end of the shank is bent as shown, and is formed in a suitable tapering tenon, M³, to engage in the socket of the bit-stock P.

In the use of the invention the squared portion A⁵ of the caster is received in the cavity $m$ between the arms M', M², thus providing for turning the shank by the turning motion of the bit-stock P. The faces of the arms M', M², which are presented against the collar A⁴ of the caster, are finished plane, as is also the said collar, so that as the device is turned any required pressure may be exerted through the bit-stock P and shank M on the collar A⁴ to urge the shank into the leg.

The device and the caster engaged therewith may be turned and forcibly pressed into the leg of the table or other article of furniture. As the device is turned, the swiveling portion B C D of the castor turns freely around and offers no obstruction to the working of the instrument.

Modifications may be made in the forms and proportions. I can turn the shank and exert the end-pressure by other devices than a bit-stock.

I claim as my invention—

The caster-setting device represented, having the shank or body M, arms M' M² in a plane at right angles to the axis thereof, and the tenon N³, adapted to serve, in combination with a caster having a collar, A⁴, and squared portion A⁵ on the shank thereof, for inserting the latter by a turning and thrusting force, substantially as herein specified.

In testimony whereof I have hereunto set my hand, at New York city, this 1st day of August, 1882, in the presence of two subscribing witnesses.

ARTHUR THOMPSON.

Witnesses:
A. H. GENTNER,
MARY F. BOYLE.